United States Patent
Lotti

(10) Patent No.: US 8,398,121 B2
(45) Date of Patent: Mar. 19, 2013

(54) SECURE COUPLED TUBE ASSEMBLY

(75) Inventor: Rinaldo Lotti, Muhlethal (CH)

(73) Assignee: Legris SAS, Renness (FR)

( * ) Notice: Subject to any disclaimer, the term of this patent is extended or adjusted under 35 U.S.C. 154(b) by 0 days.

(21) Appl. No.: 12/787,636

(22) Filed: May 26, 2010

(65) Prior Publication Data

US 2010/0253065 A1 Oct. 7, 2010

Related U.S. Application Data

(63) Continuation of application No. PCT/FR2008/001638, filed on Nov. 25, 2008.

(30) Foreign Application Priority Data

Nov. 27, 2007 (FR) ...................... 07 08274

(51) Int. Cl.
   *F16L 19/02* (2006.01)
(52) U.S. Cl. ........................... 285/325; 285/308
(58) Field of Classification Search .............. 285/3, 308, 285/67, 325, 327, 103; 29/525.08
   See application file for complete search history.

(56) References Cited

U.S. PATENT DOCUMENTS

| 787,154 | A | * | 4/1905 | Delehant | 285/327 |
| 927,337 | A | * | 7/1909 | Dupre | 184/38.3 |
| 1,790,891 | A | * | 2/1931 | Wright | 285/81 |
| 1,863,978 | A | * | 6/1932 | Foucault | 285/327 |
| 1,982,183 | A | * | 11/1934 | Tarbox | 403/331 |
| 2,286,105 | A | * | 6/1942 | Quinn | 285/327 |
| 2,926,936 | A | * | 3/1960 | Lanier et al. | 285/325 |
| 5,658,017 | A | * | 8/1997 | Chirehdast et al. | 285/4 |
| 6,065,779 | A | | 5/2000 | Moner et al. | |
| 6,145,887 | A | | 11/2000 | Cambot-Courrau | |
| 7,552,949 | B2 | * | 6/2009 | Riordan et al. | 285/403 |
| 7,775,562 | B2 | * | 8/2010 | Sawada | 285/406 |
| 2009/0050213 | A1 | * | 2/2009 | Biddell et al. | 137/15.01 |

FOREIGN PATENT DOCUMENTS

FR 2 773 458 A1 6/1999

OTHER PUBLICATIONS

The Written Opinion in corresponding International Application No. PCT/FR2008/001638.

* cited by examiner

*Primary Examiner* — Aaron Dunwoody
(74) *Attorney, Agent, or Firm* — John A. Molnar, Jr.

(57) ABSTRACT

Secure assembly of a tube coupled to a body having a bore. The coupling is provided by an insert mounted in the bore, a releasable internal retainer for retaining the tube in the bore, and a release member slidably moveable in the bore, the release member being pushable into the bore to release the retainer for uncoupling the tube from the body. A spacer is provided to prevent the release member from being pushed in. The spacer includes a clip portion inserted in a groove formed between a stationary surface of the body or the insert and an opposing shoulder surface of the release member which projects outside of the bore. The clip portion is connected by at least one breakable bridge portion to a locking portion which abuttably engages the tube to prevent the clip portion from being removed unless the bridge portion is broken by a user.

7 Claims, 1 Drawing Sheet

SECURE COUPLED TUBE ASSEMBLY

CROSS-REFERENCE TO RELATED APPLICATIONS

This application is continuation of co-pending International Application No. PCT/FR2008/001638 filed Nov. 25, 2008, which designated the United States, and which claims priority to French Patent Application 0708274, filed Nov. 27, 2007, the disclosure of each of which is expressly incorporated herein by reference.

BACKGROUND OF THE INVENTION

The present invention relates to a securely coupled assembly of a tube and a rigid part having a bore, the coupling being provided by means of a quick-coupling device for anchoring a tube in a bore of the rigid part and for sealing the coupling established merely by pushing the tube into the bore fitted with the coupling device.

Cartridge type quick-coupling devices are known that are designed to provide a leaktight connection between a tube and a bore in a rigid part, which couplings are in the form of tubular inserts that possess external means for permanently anchoring them in a rigid part, and internal means for retaining a tube.

The tube-retaining means are often implemented in the form of a washer with internal teeth, which teeth are lifted by bending when the tube is inserted and tend to bite into the tube to oppose extraction thereof. When it is desired to allow subsequent disconnection of the tube, a release pusher is placed between the tube and the body of the insert, and sliding the pusher enables the teeth to be raised so as to release the tube.

Nevertheless, it is found in practice that the pusher can be pushed in accidentally, thereby leading to untimely disconnection of the tube. Such accidental disconnection may have severe consequences insofar as it leads not only to the appearance of large leaks, that may themselves constitute a source of pollution for the surroundings to the coupling, but also to the component that is fed via the coupling being put out of operation.

Numerous competing solutions exist for constituting an obstacle to prevent the release pusher from sliding. Mention is made of those that are constituted by a ring that is interposed on fabrication of the coupling members behind the head of the pusher between said head and a stationary surface of the coupling or of the member to which it is fitted, with it being possible for the ring to be broken by means of a tool so as to allow the pusher to perform its function of releasing retention, as described in document FR 2,772,458.

In addition, to preventing accidental disconnection, the security means that constitute an obstacle to sliding the pusher also serve to constitute an indicator that the connection is intact. Known locking members having this indicator function are usually of complex structure because co-operation is organized between the latch and the coupling, with the co-operating means being of small size and therefore requiring accurate manufacture and careful assembly in order to avoid pointlessly increasing the overall size of the coupling.

A feature of the present invention is thus, in so-called "quick-coupling" devices, to prevent accidental or ill-intentioned pushing in of the pusher for releasing the retaining washer and to constitute a simple indicator that the connection has not been tampered with.

SUMMARY OF THE INVENTION

To this end, the invention provides a secure coupled assembly of a tube and a rigid part having a bore, the coupling being provided by means of a quick-coupling device including a tubular insert possessing means for anchoring it in the bore of the rigid part, releasable internal means for retaining the tube, and release means mounted to move in translation relative to the rigid part to cause the retaining means to release when the release means are pushed into the part, the release means possessing a rear portion that projects outside the part and that presents a shoulder surface situated facing a stationary surface of the part or of the tubular insert, a groove thus being defined between them for receiving an intermediate spacer that opposes the release means being pushed in, in which assembly, said spacer is in the form of a clip having at least one peripheral zone connected by means of a breakable bridge to a locking element that extends parallel to the clip, that is held at a distance from the clip by said bridge, which distance is not less than the size of the head of the pusher between the shoulder surface and the end surface, and that is placed in such a manner as to come into abutment against the tube when action is taken on the spacer to extract it from the groove.

Thus, as in the prior art, any force attempting to push in the release pusher leads to pressing the surface of the pusher shoulder against the removable intermediate spacer, itself pressing against the above-mentioned stationary surface. However, in original manner, the intermediate spacer is fitted to a coupling of standard manufacture and thus of low cost, being placed merely astride the coupling, with the indicator function of the device coming into existence only once a tube has been connected to the coupling. This connection requires the tube to pass through the concave portion of the locking means that surround, at least in part, the inlet orifice of the coupling that is provided through the head of the pusher.

The bridge constitutes a zone of weakness making it easy to separate the clip from said element. Once separated from the locking element, the clip may be extracted radially from the groove in which it is placed, if it is desired to allow the pusher to slide to release the teeth. Thus, once the connection between the clip and the locking and disconnection element has been broken, either said element in the form of a ring is still present on the tube on which it has been slid away from the coupling, or else it is lost, thereby constituting, in either circumstance, an indicator of disconnection.

The locking element may thus have the shape, as mentioned above, of a closed ring (an annulus), or the shape of an open ring, being C-shaped or U-shaped, for example, such that any attempt at extracting the clip from the groove leads to one of the branches of the U-shape or the C-shape to coming into abutment against the tube and preventing extraction. The locking member may even be L-shaped, with a base that performs the same abutment function. The locking element and the clip may be connected to each other by more than one bridge, and the clip may present branches of a shape such that a clip-fastening effect can occur between the branches and the bottom of the groove, thereby making it possible to ensure that the clip can remain in the service position, even if it has been detached from the locking element.

The present invention, accordingly, comprises the construction, combination of elements, and/or arrangement of parts and steps which are exemplified in the detailed disclosure to follow.

BRIEF DESCRIPTION OF THE DRAWINGS

For a fuller understanding of the nature of the invention, reference should be had to the following detailed description taken in connection with the accompanying drawings wherein.

The drawings will be described further in connection with the following Detailed Description of the Invention.

DETAILED DESCRIPTION OF THE INVENTION

Figure 1:
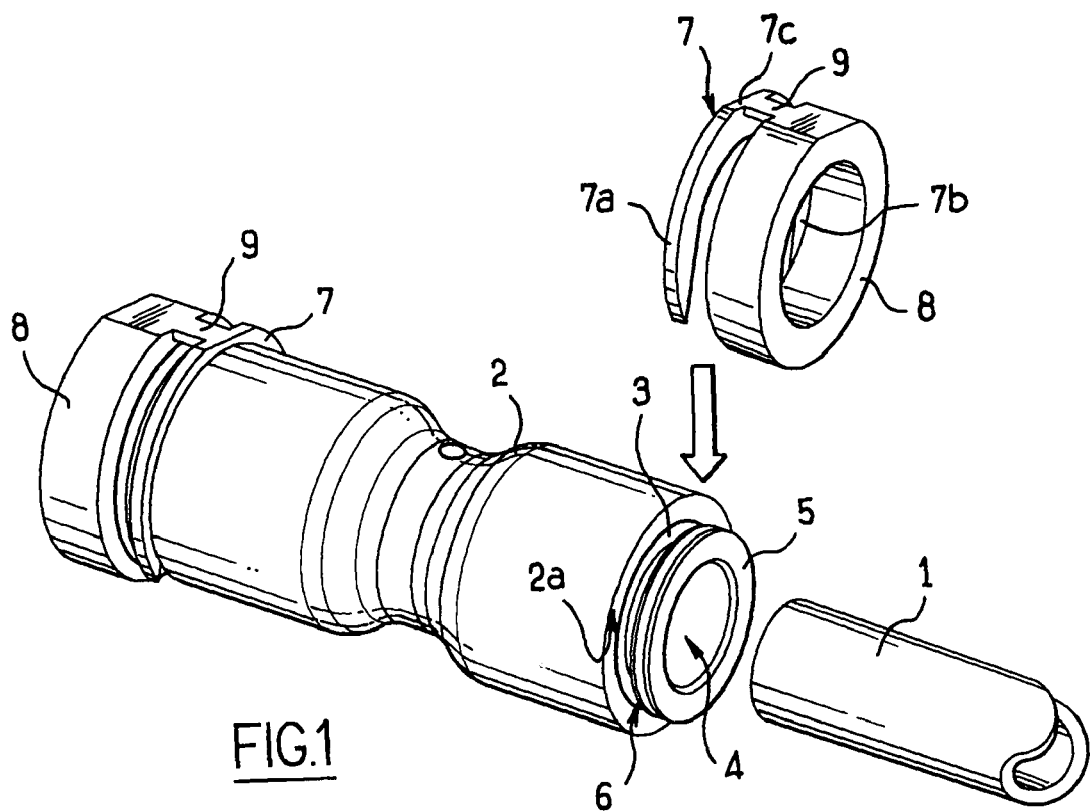
FIG. 1 shows a quick coupling in accordance with the invention.

FIG. 1 shows a quick-coupling device for coupling a tube 1 to a rigid part 2 possessing a bore in which a tubular insert 3 is housed, the insert being retained in the bore by external means for anchoring it in the bore, this general disposition itself being known.

In a likewise known manner, the tubular insert includes a toothed washer and means inside the insert 3 for releasing retention of the tube 1, said means comprising a pusher 4 mounted to move in translation in the tubular insert 3 so as to lift the teeth of the washer outwards when the pusher is pushed into the tubular insert 3. The release pusher 4 has a rear portion or head 5 that projects outside the tubular insert 3 or the rigid part 2 and that presents a shoulder surface situated facing a stationary structure 2a of the end of the stationary part 2 or of the tubular insert 3, the two surfaces lying in the same transverse plane in the example shown in the figure, by construction. A groove 6 is also defined between them.

The groove 6 is thus located where an intermediate spacer is received for preventing movement of the pusher.

The spacer 7 shown is in the form of a clip having two branches 7a and 7b that are joined together by a root portion 7c that is itself connected at its periphery via at least one breakable bridge 9 to an annular ring 8 extending parallel to the chip 7 and having an inside diameter that is not less than the outside diameter of the tube 1. The length of the bridge 9 is sufficient to ensure that the ring 8 is spaced apart from the clip 7 by a distance that is not less than thickness of the head 5 of the pusher.

Prior to making the connection, the operator slides the clip 7 into the groove 6, with the clip bearing against the bottom of the groove. In this position, the annular ring 8 is situated in front of the head 5 of the pusher and is coaxial with the opening for inserting the tube 1 in the coupling.

If it is necessary to act on the connection and to allow the pusher 4 to move, it suffices to break the bridge 9 so as to separate the clip 7 from the ring 8 and extract the clip radially. The ring 8 can then be slid along the tube 1 so as to release access to the head 5 of the pusher. When the space between the branches 7a and 7b of the clip is omega-shaped, with the branches being slightly resilient, as is true of numerous plastics materials, a small snap-fastening effect may occur against the bottom of the groove 6, and that may even make it possible to put the clip back into place in the groove, at least temporarily, after it has been separated from the ring 8.

In FIG. 1, it can be seen that the body 2 is a straight union coupling that is advantageously fitted with a latch at its other end, formed by a clip 7 and a ring 8.

Figure 2:
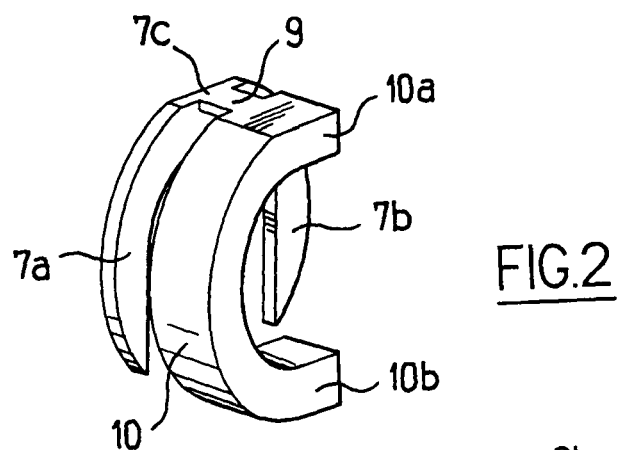
FIG. 2 is an outside view of a variant embodiment of the locking element associated with the clip.

FIG. 2 shows the clip 7 connected by the bridge 9 to an open ring 10 that is C-shaped, presenting ends 10a and 10b. The bottom end 10b of this C-shape comes into abutment against the tube 1 when action is taken on the clip in an attempt to extract it from the groove 6.

Figure 3:
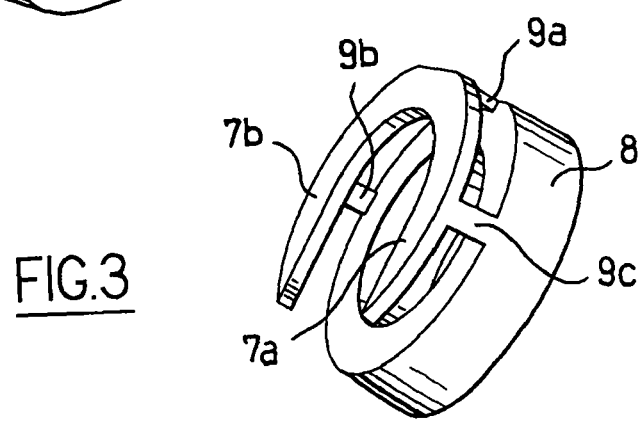
FIG. 3 is an outside view of another variant embodiment of the invention.

In FIG. 3, the clip and the ring are connected together by three bridges 9a, 9b, 9c.

The ring or the C-shape may possess a width that is relatively large and they may be of a color that is bright in order to make it possible to check locking remotely and/or by a video or more generally an optical surveillance system.

As it is anticipated that certain changes may be made in the present invention without departing from the precepts herein involved, it is intended that all matter contained in the foregoing description shall be interpreted in as illustrative rather than in a limiting sense. All references including any priority documents cited herein are expressly incorporated by reference.

What is claimed is:

1. A secure connection comprising:
a tube having a tube end;
a body having a bore with an opening into the body;
a generally annular release member having a first end received coaxially in the bore and a second end extending outside of the bore having a shoulder surface facing a stationary surface surrounding the bore opening, the tube end being receivable coaxially through the release member into the bore and being grippably retainable in the bore, and the release member end being pushable towards the stationary surface to slidably move the release member over the tube from a first position wherein the shoulder surface is axially spaced-apart from the stationary surface and a second position releasing the tube end from its grippable retention in the bore; and
a spacer comprising:
a clip portion having a first face and second face opposite the first face, the clip portion being insertable between the stationary surface and the shoulder surface in the first position of the release member for delimiting the movement of the member from the first position to the second position, with the first face being disposed opposite the stationary surface and the second face disposed opposite the shoulder surface;
at least one breakable bridge portion extending from the clip portion; and
a locking portion connected to the clip portion by the breakable portion, the locking portion being axially spaced-apart from the second face of the clip portion to define a space therebetween,
whereby with the clip portion being inserted between the stationary surface and the shoulder surface in the first position of the release member, and with the second end of the release member being received in the space between the clip portion second face and the locking portion, the tube end is received coaxially through the release member into the bore and is grippably retained therein, and
whereby the removal of the clip portion from between the stationary surface and the shoulder surface in the first position of the release member is prevented by the locking portion abuttably engaging the tube unless the bridge portion is broken by a user.

2. The connection of claim 1 wherein the locking portion is configured as a closed ring,
whereby with the clip portion being inserted between the stationary surface and the shoulder surface in the first position of the release member, the ring is aligned coaxially with the opening into the body, and
whereby the tube end is received into the bore coaxially through the release member and the ring.

3. The connection of claim 1 wherein the locking portion is configured as an open ring,
whereby with the clip portion being inserted between the stationary surface and the shoulder surface in the first position of the release member, the ring is aligned coaxially with the opening into the body, and whereby the tube end is received into the bore coaxially through the release member and the ring.

4. A method of forming a secure coupling of a tube having a tube end to a body having a bore with an opening into the body, and a generally annular release member having a first end received coaxially in the bore and a second end extending outside of the bore having a shoulder surface facing a stationary surface surrounding the bore opening, the tube end being receivable coaxially through the release member into the bore and being grippably retainable in the bore, and the release member end being pushable towards the stationary surface to slidably move the release member over the tube from a first position wherein the shoulder surface is axially spaced-apart from the stationary surface and a second position releasing the tube end from its grippable retention in the bore, the method comprising the steps of:

(a) providing a spacer comprising:

a clip portion having a first face and second face opposite the first face, the clip portion being insertable between the stationary surface and the shoulder surface in the first position of the release member for delimiting the movement of the member from the first position to the second position, with the first face being disposed opposite the stationary surface and the second face disposed opposite the shoulder surface;

at least one breakable bridge portion extending from the clip portion; and a locking portion connected to the clip portion by the breakable portion, the locking portion being axially spaced-apart from the second face of the clip portion to define a space therebetween;

(b) inserting the clip portion between the stationary surface and the shoulder surface in the first position of the release member, the second end of the release member being received in the space between the clip portion second face and the locking portion; and (c) receiving the tube end coaxially through the release member into the bore, the tube end being grippably retained therein, whereby the removal of the clip portion from between the stationary surface and the shoulder surface in the first position of the release member is prevented by the locking portion abuttably engaging the tube unless the bridge portion is broken by a user.

5. The method of claim 4 wherein the locking portion is configured as a closed ring, whereby with the clip portion being inserted in step (b) between the stationary surface and the shoulder surface in the first position of the release member, the ring is aligned coaxially with the opening into the body, and wherein the tube end in step (c) is received into the bore coaxially through the release member and the ring.

6. The method of claim 4 wherein the locking portion is configured as an open ring, whereby with the clip portion being inserted in step (b) between the stationary surface and the shoulder surface in the first position of the release member, the ring is aligned coaxially with the opening into the body, and wherein the tube end in step (c) is received into the bore coaxially through the release member and the ring.

7. The method of claim 4 further comprising the additional steps:

(d) breaking the bridge portion of the spacer; and (e) removing the clip portion of the spacer from between the stationary surface and the shoulder surface.

* * * * *